United States Patent [19]
Deas

[11] 4,086,721
[45] May 2, 1978

[54] ILLUMINATED INSECT TRAP HAVING SINGLE TRANSPARENT PLATE

[76] Inventor: Warren Deas, General Delivery, Bladon Springs, Ala. 36902

[21] Appl. No.: 731,667

[22] Filed: Oct. 13, 1976

[51] Int. Cl.² ............................................. A01M 1/04
[52] U.S. Cl. .................................................. 43/113
[58] Field of Search ..................... 43/113, 107, 132 R

[56] References Cited
U.S. PATENT DOCUMENTS

| | | | |
|---|---|---|---|
| 573,587 | 12/1896 | Freeman | 43/113 |
| 967,883 | 8/1910 | Crabtree | 43/113 |
| 1,294,036 | 2/1919 | Brackin | 43/113 |
| 2,065,047 | 12/1936 | Buford | 43/113 |
| 2,090,792 | 8/1937 | Green | 43/113 |

Primary Examiner—Ronald E. Suter
Attorney, Agent, or Firm—LeBlanc & Shur

[57] ABSTRACT

A new and improved insect trap utilizes one conventional light bulb in conjunction with a large transparent sheet or plate of Plexiglass or other suitable material of large surface area arranged to provide a light source causing insects to be attracted from both sides of such transparent plate having a large surface of area which obstructs the insects' flight path. This effectively attracts and entraps large numbers of flying insects causing them to strike the plate and be stunned and fall into an insect destroying liquid bath from both sides of the flight-obstructing transparent plate.

6 Claims, 12 Drawing Figures

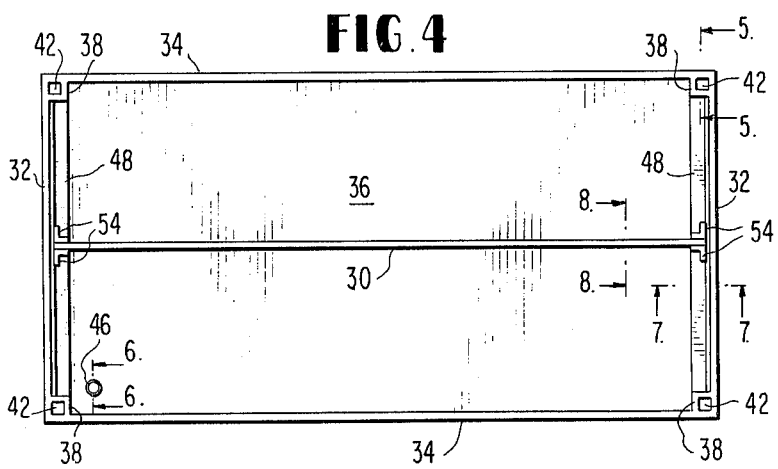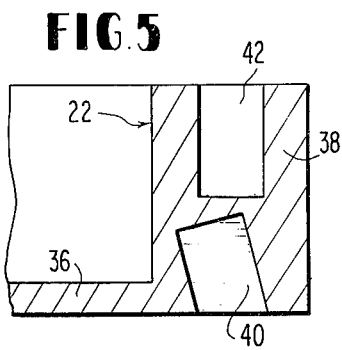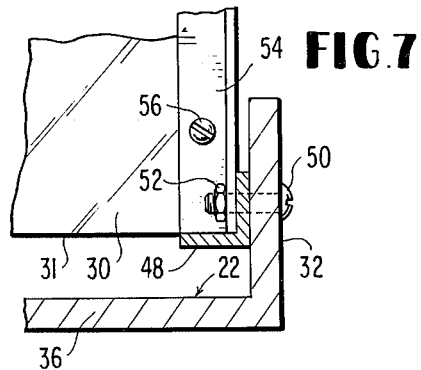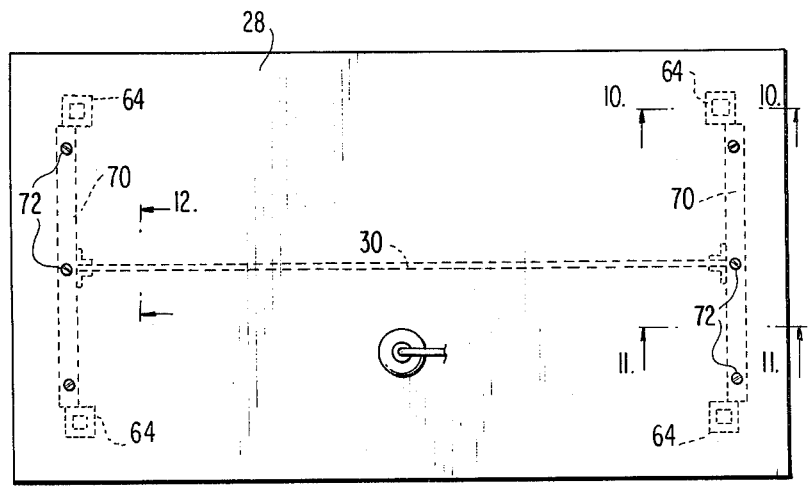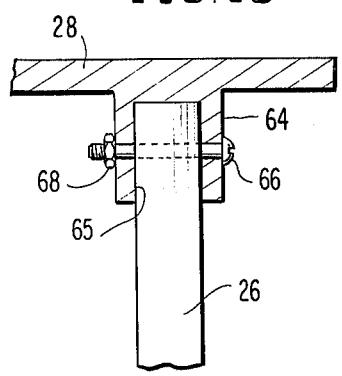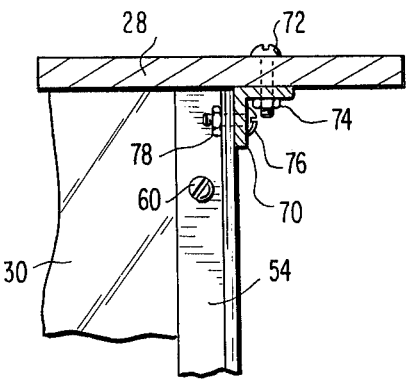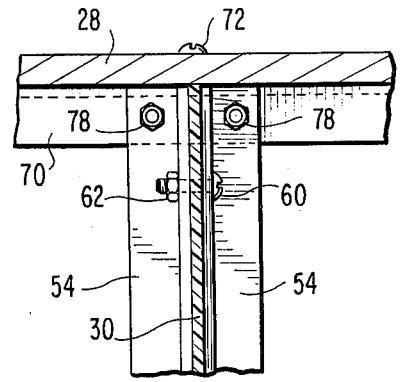

ILLUMINATED INSECT TRAP HAVING SINGLE TRANSPARENT PLATE

DESCRIPTION

The present invention relates to a novel apparatus for attracting and killing flying insects wherein light, both direct and reflected, attracts flying insects and causes them to strike a plate and drop into an insect destroying liquid medium.

There are a number of generally similar devices disclosed in the prior art including, by way of example, the following U.S. Pat. Nos. 3,515,585 — Ross; 3,487,577 — Sexton; 3,465,468 — Takamoto; 3,348,332 — O'Connell et al; 1,996,293 — House; 1,839,247 — Moore; 1,820,813 — Loomis; 1,770,737 — Gwathmey;

However, the present invention provides a new improved insect trap of such general type but also having new features of construction whereby the insect trap is more effective in operation while also enjoying simplicity and low cost of manufacture.

It is therefore an object of the present invention to provide a new improved insect trap utilizing only one conventional light bulb in conjunction with a transparent sheet of large surface area arranged so that the light source causes insects to be attracted from either side of such sheet whereby the large surface area obstructs the insects' path of flights causing a large number of insects to be stunned and fall into an insect destroying medium. It is a related object of this invention to provide such an improved insect trap presenting a particularly large area of obstruction to flight of insects attracted by the light source of such insect trap, and having a large receptacle for liquid insect destroying medium extending on both sides of the insect flight obstructing medium, utilizing a single light source. It is yet another object to provide such a new improved insect trap utilizing components and constructional features providing various advantages in manufacture, assembly and use. It is still a further object of the present invention to provide such a new improved insect trap of increased effectiveness which also lends itself to economical manufacture from commercially available complements.

The above and other objects of the present invention will be apparent from the following description thereof with reference to the accompanying drawing, wherein:

FIG. 4 is a top view of the base section of the insect trap shown in FIGS. 1-3;

FIG. 5 is a partial sectional view taken along line 5—5 in FIG. 4;

FIG. 6 is a partial sectional view taken along line 6—6 in FIG. 4;

FIG. 7 is a partial sectional view taken along line 7—7 in FIG. 4 showing details of support means for the transparent insect flight path obstruction plate utilized in the insect trap shown in FIGS. 1-3;

FIG. 8 is a partial sectional view along line 8—8 in FIG. 4 showing details of support means for the transparent insect flight obstruction plate utilized in such insect trap;

FIG. 9 is a top plan view of the roof or top of the insect trap shown in FIGS. 1-3;

FIG. 10 is a fragmentary sectional view taken along line 10—10 in FIG. 9 showing details of the means for supporting the roof of the insect trap;

FIG. 11 is a fragmentary sectional view taken along line 11—11 in FIG. 9 showing additional details of the trap roof support mount means; and FIG. 12 is a sectional view taken along the line 12—12 in FIG. 9 showing additional details of means for mounting the trap roof in relation to upper portion of the transparent insect flight obstruction plate.

Figure 1:
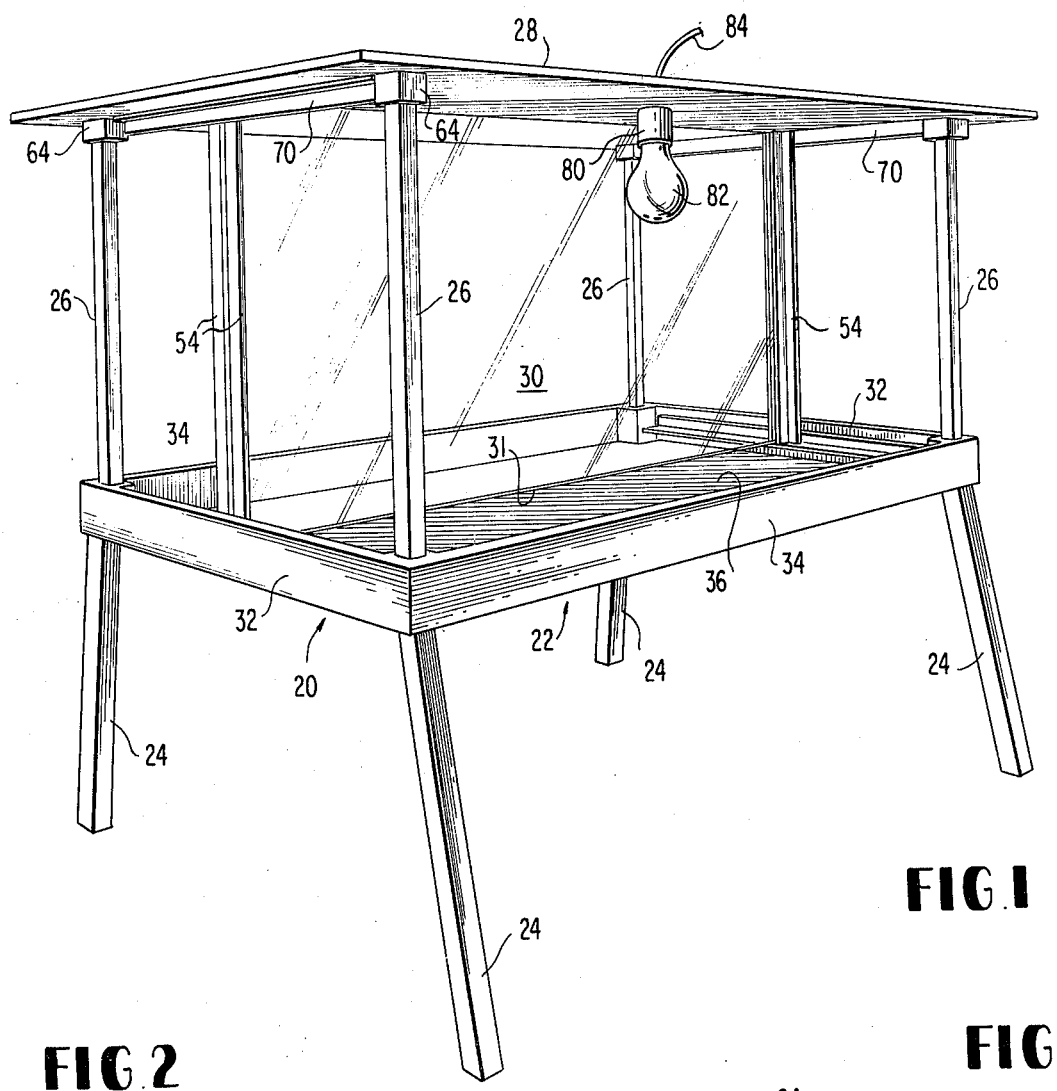
FIG. 1 is a perspective view of an assembled insect trap of illustrative preferred embodiment according to the present invention.
Figure 2:
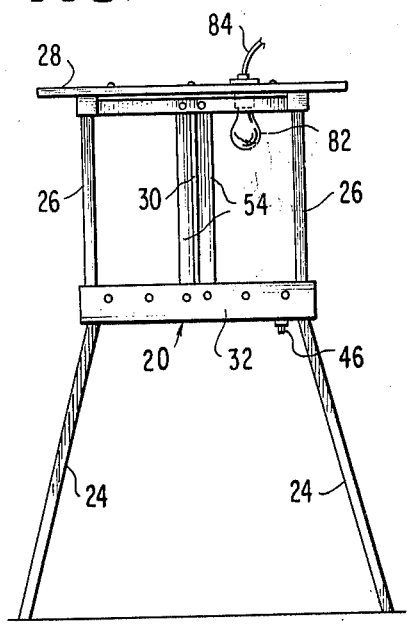
FIG. 2 is a side end view of the insect trap shown in FIG. 1.
Figure 3:
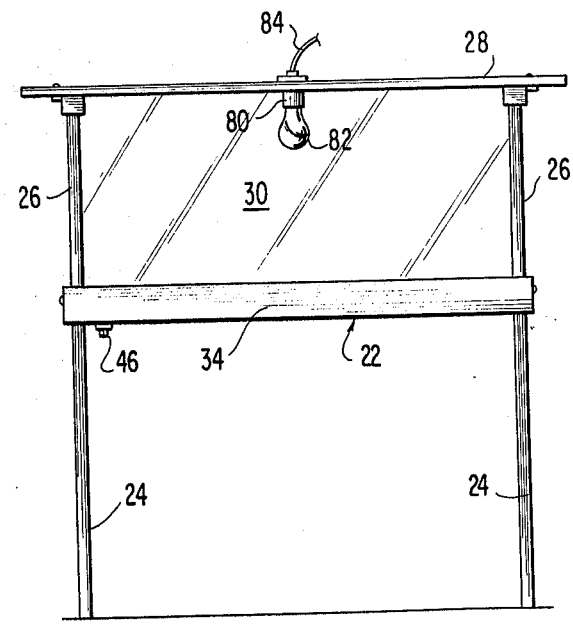
FIG. 3 is a front elevation view of the insect trap shown in FIGS. 1 and 2 (looking to the right in FIG. 2)

Referring to the drawings and especially FIGS. 1-3 (and other figures for details), an insect trap according to the present invention is generally indicated by numeral 20. The insect trap 20 includes a base 22, a plurality of legs 24 (four), a plurality of roof supporting posts 26 (four) extending upwardly from base 22, a roof or top 28 supported by the upper ends of vertically disposed supporting posts 26, and a transparent insect flight obstruction plate 30 extending vertically from below top 28 to near the upper inside surface of base 22 and also extending horizontally between the shorter sides 32 of base 22 midway between the longer sides 34 of base 22.

Referring particularly to FIGS. 1, 4 and 5, the base 22 comprises a base plate 36 surrounded by the two end walls 32 and two side walls 34 to form a receptacle for receiving and holding a bath of liquid which is poisonous to insects, such as various commercially available petroleumbase liquids known to be suitable for such purpose.

The base 22 has an enlarged section 38 at each of its four corners. The underside of base 22 is provided in each of the four enlarged corner sections 38 with a bottom recess 40 (shown particularly in FIG. 5) for receiving in each such recess one of the legs 24. It will be noted with particular reference to FIGS. 5 and 2 that each underside base recess 40 is preferably disposed at a suitable angle to the vertical plane of the longer base side walls 34 whereby legs 24 extend outwardly at a like suitable angle to such vertical plane (e.g. about 15°) thus providing the insect trap 20 with more stability against tilting. Each of enlarged sections 38 at each corner of the base 22 is also provided on the upper sides with downwardly extending upper recess 42 which is designed to receive and retain roof supporting posts 26, the tops of which in turn support roof top 28 of trap 20. The bottom plate 36 of base 22 is provided at a suitable position, e.g. in one corner, with an internally threaded aperture 44 extending through base bottom plate 36 and of such a size that aperture 44 provides means for readily draining base 22 of the liquid bath and insects caught in it. Externally threaded drain plug 46 is received in threaded drain aperture 44 as shown in FIG. 6, and plug 46 may be removed when necessary or desirable for draining of liquid bath and insects from the liquid bath receptacle provided by such base 22.

The base legs 24 and roof supports 26 may be of aluminum extrusion, plastic or other suitable material, formed with appropriate configuration matching the configuration of the underside base apertures 40 and upper side base apertures 42 in base 22 (rectangular legs 24 and 26 being illustratively shown as suitable).

Referring particularly to FIGS. 7 and 8, each of the shorter sides 32 of the base 22 has mounted on the inside thereof an angle member 48 secured to each side 32 by suitable fasteners such as screws 50 and nuts 52. Referring especially to FIGS. 7, 8, 10 and 11, horizontally extending angles 48 on each of sides 32 of base 22 in turn receive the bottom portions of a pair of angles 54 which are also secured to the side walls 32 of base 22 by means of screws 50 and nuts 52. One pair of such angles 54 is secured to each of side walls 32 of base 22, with one such angle 54 being disposed on each side of transparent plate 30, the latter being connected to the sides of angles 54 by bolts 56 and nuts 58 near the bottom of transparent plate 30, as shown particularly in FIGS. 7 and 8. The upper portions of angles 54 are also secured to upper portions of transparent plate 30 a short distance below roof or top 28 by means of bolts 60 and nuts 62, as shown particularly by FIGS. 12 and 9.

Referring to FIGS. 10, 11 and 9, the roof or top 10 has extending from the underside thereof four short projections or posts 64, each having an aperture 65 therein for receiving the upper end of one of roof-supporting posts 26, with the upper end of each of roof posts 26 secured within such recess 65 and thus to the top 28 by means of screws 66 and 68 (or equivalent fastening means), as shown particularly in FIG. 10. Referring to FIG. 11, the top roof 28 is also secured to the vertically extending angles 54 which support transparent plate 30 by means of angle brackets 70 which have one side secured to the underside of top roof 28 by screws 72 and nuts 74 and which have their other side secured to sides of angles 54 by screws 76 and nuts 78.

Referring particularly to FIGS. 1-3, a conventional light socket 80 is mounted in top roof 28; socket 80 receives a light source, preferably a conventional incandescent bulb 82 (e.g. 100 watt) and has extending therefrom a conventional electric cord 84 for connection to a standard electrical power outlet.

Transparent insect flight obstruction plate 30 preferably is made of a suitable sheet plastic material such as that sold under the name PLEXIGLASS, but plate 30 may be made of other equivalent material. Referring particularly to FIGS. 1, 7 and 8, the bottom 31 of transparent plate 30 is disposed a suitable distance above the bottom plate 36 of base 22 thus providing room for a bath of suitable depth of liquid poisonous to insects which fly into plate 30 and are thus stunned and fall into such bath.

In a typical embodiment, the base 22 is about one foot six inches wide on sides 32, about three feet long on sides 34 and about six inches deep, with the distance between the top of base plate 36 and top roof 28 being about one foot six inches. Other components are arranged substantially proportional as shown in the drawings; however, different suitable sizes may be used.

In operation, the receptacle formed within base 22 is filled with liquid poisonous to insects to a level below bottom edge 31 of transparent insect flight obstruction plate 30. Light bulb 82 is turned on, and there is a direct and indirect lighting effect over the surface of transparent plate 30 which causes flying insects to be attracted to plate 30. Plate 30 obstructs the flight path of the light attracted insects and stuns the insects causing them to fall into the liquid bath contained in base 22 whereby the insects are killed. Periodically, plug 46 is removed to drain base 22 of liquid bath and insects contained in the same, and the liquid bath is replenished as needed.

It will be seen from the foregoing that the described invention provides a new and inproved insect trap utilizing one conventional light bulb in conjunction with a large transparent sheet or plate of Plexiglass or other suitable material of large surface area arranged to provide a light source causing insects to be attracted from both sides of such transparent plate having a large surface of area which obstructs the insects' flight path. This effectively attracts and entraps large numbers of flying insects causing them to strike plate 30 and be stunned and fall into an insect destroying liquid bath from both sides of the flight-obstructing transparent plate. It is also apparent that the present invention comprises a new improved simplified insect trap utilizing components and structural features which provide various advantages in manufacture, shipping, assembly, use, disassembly and cleaning, and which also enable economical manufacture from commercially available components and materials.

It will be understood that while the invention has been disclosed with reference to specific embodiment, the invention is not limited to the specific construction disclosed but may include departures therefrom without departing from the spirit of the invention as disclosed and claimed.

What is claimed is:

1. An insect trap comprising: container a bottom plate and a plurality of walls forming a rectangular container for providing a reservoir for a liquid and insects; a plurality of legs extending from said base for supporting same; a transparent plate extending continuously along a center line of said container from a first wall to a second wall opposite said first wall across said reservoir and means for mounting said plate on the walls of said container above said reservoir with said reservoir extending laterally from both sides of said plate; support posts extending upwardly from said container; a top mounted on said support post above said transparent plate; and light means mounted on said top; said bottom plate including means for draining said reservoir; and the space between said container and said top on either side of said transparent plate being open to permit insects to fly therebetween.

2. An insect trap as defined in claim 1 wherein said transparent plate is made of Plexiglass.

3. An insect trap as defined in claim 1 wherein said container includes leg recesses receiving portions of said support legs; said container also including post recesses receiving said posts supporting said top; and said leg recesses and said post recesses being located in enlarged portions at the corners of said container.

4. An insect trap comprising:
 a bottom plate and a plurality of walls forming a rectangular container for providing a reservoir for liquid and insects;
 a transparent plate extending continuously along the center line of said container from a first wall to a second wall opposite said first wall across said reservoir and means for mounting said plate on the walls of said container above said reservoir, said reservoir extending laterally from both sides of said plate;
 a top mounted above said transparent plate and being supported by support posts;
 light means mounted on said top;
 a plurality of legs extending from said container for supporting same;
 said container defining an enlarged portion at each corner thereof, said enlarged portion having leg recesses for receiving portions of said support legs and post recesses for receiving said posts supporting said top;

bracket means attached to each of said first and second walls for mounting said transparent plate above said reservoir; and additional bracket means extending from said bracket means to said top for supporting edges of said transparent plate therebetween and supporting and retaining said top; the space between said container and said top on either side of said transparent plate being open to permit insects to fly therebetween.

5. An insect trap as defined in claim 4 wherein said light means includes a standard bulb socket mounted on said top of the insect trap.

6. An insect trap as defined in claim 5 wherein said transparent plate is made of plexiglass.

* * * * *